United States Patent Office 2,932,371
Patented Apr. 12, 1960

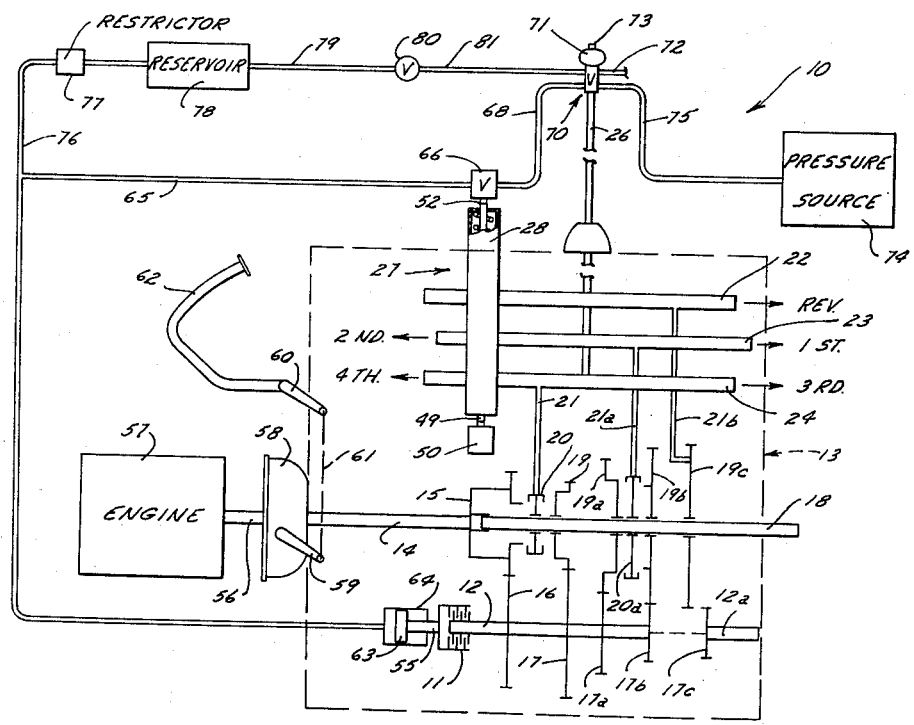
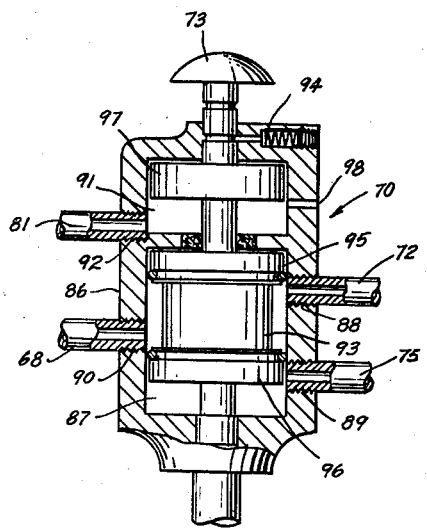

2,932,371

AUTOMOTIVE DEVICE

Thomas Backus, Kalamazoo, and Charles M. Perkins, Oshtemo Township, Kalamazoo County, Mich., assignors to Fuller Manufacturing Company, a corporation of Delaware Application November 5, 1958, Serial No. 772,021

3 Claims. (Cl. 192—4)

This invention relates to an improved apparatus for controlling a brake associated with the engine-connected, or driven, part of a change gear system and, more particularly, relates to an apparatus for controlling a brake, as aforesaid, in which the brake is automatically released a predetermined time after it is applied. This application relates to the subject matter of application Serial No. 635,303, filed January 22, 1957, now Patent No. 2,875,872 by Thomas Backus and assigned to the assignee of the present invention.

The above-mentioned application discloses a control system for operating a brake connected to an engine-connected element, such as the countershaft, of a change gear system. The control system includes two power flow controls, such as valves, connected in series between a power source, such as a fluid pressure source, and a brake applying device, such as a fluid pressure operated piston and cylinder arrangement, for actuating the brake. One of the valves is manually or pedally preselectable at the will of the operator and the other valve is automatically operable when the parts of the change gear system are in neutral to permit flow of fluid pressure to the piston and cylinder arrangement. Thus, application of the brake can be preselected as and when desired by the operator and, thereafter, as soon as the change gear system enters neutral, the second valve will be automatically actuated and the countershaft brake will be applied.

While the above described control system is effective and reliable for its intended purpose, continuing efforts have been made to improve its operating characteristics and dependability. In particular, in prior devices, including that of Serial No. 635,303, now Patent No. 2,875,872 the brake is released when the automatically operated valve is closed and this occurs when shiftable parts move out of their neutral position. In a very rapid shift, it may happen that the parts may move out of neutral position and into the next shifted position more rapidly than the brake can be released by the action of the automatically controlled valve, thus resulting in roughness in operation and excessive wear on the brake. Accordingly, it has been found desirable to automatically release the brake, regardless of the position of the valves, at a predetermined time after the brake is first applied, and to fix such time at not more than required to achieve full synchronization. In this manner, it is possible to avoid the difficulty above-mentioned and a smooth and rapid shift under the full control of the operator is achieved.

Accordingly, the objects of the invention include the following:

(1) To provide an improved apparatus for controlling the operation of a brake for an engine-connected part of a change gear system or transmission;

(2) To provide an improved control system for a brake, as aforesaid, in which the brake is automatically released at a predetermined time after application thereof;

(3) To provide an improved control system, as aforesaid, which has all of the advantages of the system shown in Serial No. 635,303 and which is provided with a small number of additional parts to enable it to automatically release the brake a predetermined time after application thereof; and (4) To provide an improved control system, as aforesaid, in which the additional parts required are simple, inexpensive, and reliable in operation.

Other objects and advantages of the invention will become apparent to persons acquainted with apparatus of this general type upon reading the following specification and inspecting the accompanying drawings, in which:

Figure 1 is a schematic view of a system embodying the invention.

Figure 2 is a sectional view of one type of valve which may be utilized in the apparatus.

General description

In general, the invention utilizes a control system substantially identical to that disclosed in Serial No. 635,303, now Patent No. 2,875,872, wherein the energization of a brake on a countershaft is carried out by a system including two power flow control devices arranged in series between a power source and a power operated arrangement for actuating the brake. One of the devices is controllable and preselectable by the operator and the other device is controlled by the position of the transmission parts. In operation of a vehicle, when an upshift is to be performed, the first device is placed in a condition, by manual or pedal actuation by the operator, for applying the brake and the other device is placed in condition for permitting application of the brake when the transmission parts next reach neutral.

The invention provides, in conjunction with the above-mentioned devices, a third control device which is connected for operating the first mentioned device to reverse its setting and thereby release the brake. The third device, which may also be a valve, is operated a predetermined time after power is applied to cause application of the brake. In this manner, the countershaft brake is automatically released a predetermined time after application thereof.

Detailed description

As used herein, both hereinbefore and hereinafter, the term "engine-connected end" of the transmission will be understood to mean those parts of the transmission which may be driven by the engine when the clutch is engaged and the transmission is in neutral, regardless of whether they are actually being so driven at a particular moment, as contrasted with the parts of the transmission which are driven by the inertia of the vehicle when the transmission is in neutral.

Referring first to the Figure 1 of the drawings, there is shown apparatus giving the operator the maximum control over the brake consistent with the concept of permitting it to become actuated only when the transmission is in neutral position. In this embodiment, the manually actuable control is arranged for independent operation by the operator of the equipment and is in this particular case placed at the upper end of the vehicle shift lever.

As shown in the Figure 1, the transmission control mechanism to which this invention relates is comprised of an energy control system 10 and a speed decelerating device, such as the countershaft brake 11, operable by said control system 10. The brake 11 is associated with an engine-connected element, such as the countershaft 12, of a change gear system, such as a heavy duty vehicle transmission 13. The transmission 13, may be of conventional construction, such as substantially similar to the transmission disclosed and described in the United States Patent No. 2,637,221, and hence needs no extensive detailing.

Briefly, however, said transmission has an input shaft 14 which is connected to the countershaft 12 by means of the continuously meshed gears 15 and 16 mounted upon the shafts 14 and 12, respectively. The countershaft 12 is provided with a plurality of gears 17, 17a and 17b which are rotatable therewith and connectible, one at a time, to the main shaft 18 of said transmission 13 in a conventional manner by means including the gears 19, 19a and 19b supported upon said main shaft 18. The gears 19, 19a and 19b are in this embodiment rotatable with respect to the main shaft 18 and are in continuous mesh with corresponding gears 17, 17a and 17b on the countershaft 12. The shiftable element 20, splined on said shaft 18 for axial movement therealong, is provided for effecting engagement between the gear 19 and the shaft 18. The element 20 also serves alternately to connect the gear 15 to said shaft 18 for direct drive. A shift yoke 21 connected to the shift rod 24 effects the axial shifting of the element 20. The gears 19a and 19b are alternatively connectible to the shaft 18 by the shiftable element 20a which is splined on the shaft 18. A shift yoke 21a on the shift rod 23 effects the axial shifting of the element 20a. The reverse gear 19c is shiftable along the shaft 18 into engagement with the reverse gearing 17c which is mounted on a reverse shaft 12a driven from shaft 12. The reverse gear 19c is shiftable by a shift yoke 21b connected to shift rod 22. The shift rods are operable in a well-known manner by means such as a conventional shift lever 26.

Actuating mechanism 27, which may be generally similar to that shown in Patent No. 2,775,901, is provided for actuating one of the two serially arranged energy controlling devices by which the brake 11 is controlled. The actuator mechanism 27 includes a pair of actuating pins 49 and 52 which are adapted to operate suitable control devices, such as the micro-switch 50 and the valve 66, respectively. As described in detail in Serial No. 635,303, the actuating pins are positioned to actuate the micro-switch 50 and the valve 66 whenever one of the shift rods is out of neutral condition. The micro-switch 50 is adapted to control operation of auxiliary equipment, such as an auxiliary transmission, not shown.

The input shaft 14 is connectible to the output shaft 56 of a conventional engine 57, through a clutch 58, which is disengaged by operation of a lever 59 in a substantially conventional manner. The clutch lever 59 is connected by linkage 61 to a clutch pedal 62 which is pivotally supported at 60 in a conventional manner.

The countershaft brake 11 may be of any conventional type, such as a brake having a plurality of interleaved plates, some of which are mounted upon and rotatable with said countershaft 12, and the remainder of which are non-rotatably mounted and adapted for engagement with the rotatable plates in response to movement of the rod 55 extending from the piston 63.

The brake 11 may be controlled as desired, such as by suitable pressure fluid or by electrical means and is here shown, for illustrative purposes, as being controlled by pressure fluid means. In this embodiment, the brake is operated by a pressure fluid actuated piston 63 disposed within a pressure cylinder 64 which is connected to a pressure supply conduit 65. The conduit 65 is, in turn, connected to a valve 66 whose operation is responsive to the position of the shift rods. The valve 66 is arranged, in this particular embodiment, so that it normally connects the conduit 65 to the conduit 68. However, the valve 66 is positioned operatively adjacent the actuating pin 52 for operation thereby such that extension of said pin from the housing 28 will operate said valve 66 to block communication between conduits 65 and 68. Thus, it will be seen that when the shift rods 22, 23 and 24, hence the actuator mechanism 27, are in the neutral position, the valve 66 will be connecting the conduit 65 to the conduit 68. However, when one of the shift rods 22, 23 and 24 is out of its neutral position, the valve 66 will close off such communication.

The conduit 68 is also connected to the operator and fluid pressure actuated three-way valve 70 which in this particular embodiment is supported upon the shift lever 26 adjacent the manually engageable knob 71 at the upper end of said shift lever. A conduit 75 connects the valve 70 with a fluid pressure source 74. The valve 70 is arranged so that it normally closes the conduit 75 and connects the conduit 68 to the exhaust port 72 thereof. A manually operable actuator 73, which is preferably disposed adjacent to, or on, the knob 71, is provided for moving the valve 70 into such a position that the conduit 75 is connected to conduit 68 and the exhaust port 72 is closed. Thus, it will be seen that for pressure fluid to pass from the source 74 to the pressure cylinder 64, both the valve 66 and the manually and fluid pressure actuated valve 70 must be moved, or permitted to move, out of their respective closed or energy blocking positions and into their open or energy conducting positions.

A branch conduit 76 is connected to the conduit 65 and is connected through a one-way restrictor 77 to a reservoir 78. The reservoir 78 is connected by a conduit 79 to a fluid pressure operated valve 80 which is normally closed. When a suitable pressure is built up in the reservoir 78, the fluid pressure actuated valve 80 is opened and supplies fluid pressure to a conduit 81 which is connected to the manually and pressure fluid operated valve 70 for supplying fluid pressure thereto to operate same. Supply of fluid pressure to the valve 70 from conduit 81 will shift the valve, as described in greater detail hereinbelow, so that it blocks communication between the source 74 and the conduit 68.

While any of many standard and well-known valves may be utilized for the valve 70 the following description for one particular valve suitable for this purpose is submitted as an aid to a full understanding of the invention. The valve 70 here shown has a generally cylindrical casing 86 having a chamber 87 therein. Ports 88, 89 and 90 communicate with said chamber 87 and said ports are connected, respectively, with the conduits 72, 75 and 68. The casing 81 has a second chamber 91 coaxial with the chamber 87 and spaced axially and isolated therefrom. The chamber 91 is provided with a port 92 at the lower end thereof which port communicates with the conduit 81. A valve spool 93 is slidably disposed within the chambers 87 and 91 and has enlarged flanges 95 and 96 thereon within chamber 87 sealingly engaging the wall thereof. In the lower position of the spool 93, port 90 communicates with port 89 while flange 95 blocks port 88 from port 90. In the upper position of the spool 93, port 90 communicates with port 88 and flange 96 blocks port 89 from port 90.

The valve has a further flange 97 thereon acting as a piston within the chamber 91. Detent structure 94 is provided for holding the spool 93 in either its lower or its upper position until the forces applied thereto, either manual or fluid pressure, move the spool out of such position. A bleed opening 98 communicates with chamber 91 to exhaust pressure therefrom when the piston 97 reaches its full upward position. Thus, pressure in conduit 81 will be effective to move the valve spool to its upward position and such pressure will then exit from chamber 91 through bleed opening 98 so that the spool can readily be moved to its lower position by depression of button 73.

It will be seen that when the operator depresses the button 73 and thereby moves spool 93 to its lower position, the conduit 75 will be connected to the conduit 68. The spool 93 will be held by the detent 94 in such lower position. When pressure appears in the line 81, it is conducted through the port 92 into the chamber 91 and acts against the flange 97 and returns the spool 93 to its upward position whereby the line 68 is connected to the line 72. The detent 94 will hold the valve in this position until the button 73 is again depressed by the operator.

Operation

Referring now to the operation of the structure disclosed in the drawings, it will be assumed, for the purpose of convenience and illustration, that the engine 57 is operating, that the clutch 58 is engaged and that the transmission is in first gear so that the vehicle associated therewith is moving forwardly and one of the shift rods, here the shift rod 23, is in shifted position which, operating through the actuating mechanism 27, effects an extension of the pin 52. Accordingly, the valve 66 is in a position blocking communication between the conduit 68 and conduit 65. Thus, even if the valve 70 actuated by the operator, thereby connecting the conduit 75 to the conduit 68, fluid pressure will be blocked by the valve 66 from flowing into the pressure cylinder. When it becomes desirable to effect an upshift of the transmission 13, wherein the use of the countershaft brake 11 will be desired, the operator may operate the valve 70 by depressing the actuator prior to movement of the shift lever 26, which he will ordinarily do about the same time that he depresses the clutch pedal 62 to disengage the clutch 58. The shift lever is then moved into its neutral position whereby the shift rod 23 is moved into its neutral position. When the shift rod 23 reaches its neutral position and the actuating pin 52 is thereby permitted to move away from the valve 66, said valve wall immediately open and connect the conduit 65 to conduit 68 so that pressure fluid can then flow from the source 74 through the conduit 75, conduit 68 and conduit 65 to the pressure cylinder 64 and thereby apply the countershaft brake 11. Continued pressure on the shift lever will effect shifting of the transmission into its new gear position as soon as synchronization has occurred in said transmission in an otherwise substantially conventional manner.

When the conduit 65 is pressurized, branch conduit 76 will be pressurized to a corresponding extent and, therefore, will conduct fluid pressure through the restrictor 77 into the reservoir 78. The restrictor is of any suitable type and is provided so that the reservoir 78 will be pressurized to a valve sufficient to open valve 80 a predetermined time after the brake 11 is applied to the countershaft. When the pressure within the reservoir 78 reaches the predetermined value, such pressure will cause the valve 80 to open. When this occurs, fluid pressure is supplied from the reservoir 78 to operate the valve 70 and to return said valve to the position which it occupied before it was manually operated by actuation of actuator 73, namely, the position wherein the fluid pressure source 74 is blocked from communication with the conduit 68 and said conduit is connected to exhaust. This immediately releases the countershaft brake, and, thus, the countershaft brake is released a predetermined time after it is applied though the valve 66 is still open.

It will be seen that the operation of the countershaft brake 11 is entirely independent of the operation of the clutch 58, and even if such operation is initiated prior to the beginning of the shift, the brake will not be applied until the transmission has been placed in neutral.

It will be readily understood, as disclosed in the aforementioned Serial No. 635,303, that the valve 70 instead of being manually operated could be pedally operated, such as in response to the depression of the clutch pedal, if desired.

While a particular preferred embodiment of the invention has been disclosed in detail hereinabove, it will be recognized that the invention includes such variations or modifications thereof as lie within the scope of the invention as defined in the appended claims.

We claim:

1. In a control mechanism for a speed decelerating device associated with an engine connected element of a change speed gear system, said mechanism including a source of power and power operated means for controlling operation of said decelerating device, a pair of power flow controls connected in series between said source and said power means for controlling application of power from said source to said power means, means operable by an operator for controlling the setting of one of said flow controls and means automatically responsive to the position of said change speed gear system with respect to neutral for controlling the setting of the other of said flow controls, the improvement in said control mechanism which comprises time delay means responsive to the flow of power from said source to said power operated means for terminating flow of power a predetermined time after initiation of flow of power so that said speed decelerating device is applied for a controlled period of time and is then released.

2. In apparatus for controlling the application of a brake to an engine connected part of a change gear system, said apparatus including a brake associated with an element of the engine connected side of the change gear system and fluid operated actuating means for said brake, a first manually controllable valve, a second automatically controllable valve and means responsive to the condition of said system with respect to its neutral position for opening said second valve when said system is in its neutral position and for closing said second valve when said system is out of neutral position, a source of fluid pressure and means connecting said first and second valves in series between said source and said actuating means, the improvement in said apparatus which comprises valve means connected for closing off communication between said source and said actuating means and time delay means responsive to the flow of fluid pressure to said actuating means for actuating said valve means a predetermined time after initiation of flow of fluid pressure to said actuating means to terminate such flow so that said brake is released a predetermined time after application thereof.

3. In apparatus for controlling the application of a brake to an engine connected part of a change gear system, said apparatus including a brake operatively associated with an element of the engine connected side of the change gear system and fluid operated actuating means for said brake, a first manually controllable valve, a second automatically controllable valve and means responsive to the condition of said system with respect to its neutral position for opening said second valve when said system is in its neutral position and for closing said second valve when said system is out of neutral position, a source of fluid pressure and means connecting said first and second valves in series between said source and said actuating means, the improvement in said apparatus which comprises a fluid pressure operated third valve connected for opening and closing said first valve; a reservoir having an outlet connected for supplying fluid pressure to said third valve, said reservoir having an inlet, and means, including a restrictor, connecting said inlet to the said actuating means so that fluid pressure is built up within said reservoir in response to application of fluid pressure to said actuating means, the rate of build-up of pressure in the reservoir being such that said third valve is operated to close said first valve a predetermined time after said first valve is manually opened whereby said brake is released a predetermined time after application thereof.

References Cited in the file of this patent

UNITED STATES PATENTS

| 1,770,295 | Brice | July 8, 1930 |
| 2,550,545 | Findley | Apr. 24, 1951 |